United States Patent [19]

Shimizu et al.

[11] Patent Number: 4,646,107

[45] Date of Patent: Feb. 24, 1987

[54] XY PLOTTER APPARATUS

[75] Inventors: Takanori Shimizu; Masahiko Ikeda, both of Hiratsuka, Japan

[73] Assignee: Pilot Man-nen Hitsu Kabushiki Kaisha, Tokyo, Japan

[21] Appl. No.: 815,316

[22] Filed: Jan. 2, 1986

Related U.S. Application Data

[63] Continuation of Ser. No. 612,024, May 18, 1984, abandoned.

[30] Foreign Application Priority Data

May 21, 1983 [JP] Japan .................................. 58-89659

[51] Int. Cl.⁴ ........................ G11B 9/00; G01D 15/16
[52] U.S. Cl. .................................. 346/74.2; 346/74.3; 346/74.5; 346/139 C
[58] Field of Search ....................... 346/74.2, 74.3, 29, 346/139 C, 74.5; 358/301; 340/788; 434/409; 364/520

[56] References Cited

U.S. PATENT DOCUMENTS

| | | | |
|---|---|---|---|
| 3,591,939 | 7/1971 | Payne et al. ..................... | 340/788 X |
| 3,968,498 | 7/1976 | Uchiyama ............................. | 346/29 |
| 4,288,936 | 9/1981 | Okutsu ................................ | 434/409 X |
| 4,380,768 | 4/1983 | Palombo et al. .................... | 346/74.5 |
| 4,536,770 | 8/1985 | Allen et al. ........................... | 346/29 |

FOREIGN PATENT DOCUMENTS

| | | |
|---|---|---|
| 59-31710 | 2/1984 | Japan . |
| 59-65350 | 4/1984 | Japan .................................. 364/520 |
| 744484 | 7/1955 | United Kingdom . |
| 1343752 | 1/1974 | United Kingdom . |
| 1532968 | 11/1978 | United Kingdom . |
| 1584521 | 2/1981 | United Kingdom . |

OTHER PUBLICATIONS

T. M. Berry and J. P. Hanna, "Ferromagnetography-High Speed; General Electric Review, Jul. 1952, pp. 20-22, 61.

Primary Examiner—E. A. Goldberg
Assistant Examiner—Linda M. Peco
Attorney, Agent, or Firm—Wenderoth, Lind & Ponack

[57] ABSTRACT

An XY plotter apparatus includes a magnetic panel, a writing tool for applying a magnetic field, a writing tool drive and an erasing magnetic field generator. The writing tool consists of an electromagnet which is arranged so that specified characters and figures may be displayed at a high speed on a magnetic panel by the writing tool. Data of a figure to be displayed is inputted into the writing tool drive so as to generate signals for position control and a signal for actuating a switch for a coil inside the electromagnet.

15 Claims, 6 Drawing Figures

XY PLOTTER APPARATUS

This application is a continuation, of now abandoned application Ser. No. 612,024, filed May 18, 1984, abandoned.

BACKGROUND OF THE INVENTION

1. Technical Field of the Invention

The present invention relates to an XY plotter apparatus capable of displaying specified characters and figures at a high speed on a magnetic panel.

2. Prior Art

It is known that a conventional XY plotter apparatus draws a figure on a surface of a common recording form by using a writing tool such as, for example, an ink pen. In other words, the writing tool is held at a position where it lightly contacts the recording form and its operation is controlled by the writing tool drive. The writing tool drive is intended to drive the writing tool in the X-axis direction and the Y-axis direction, respectively, and can draw a desired figure on said recording form by supplying a signal for which relevant data has been processed as to a figure to be drawn to said writing tool drive. In this case, it is necessary to move the writing tool to a certain specified position to display a next line after the display of a line has been completed. At this time, the writing tool is slightly moved away from the recording form by the writing tool drive and the coordinate signals for X and Y-axis directions which show a new position can be applied to the writing tool drive. Though a time required to display a figure is relatively short, a figure drawn once on the recording form cannot therefore be erased and the recording form should be replaced.

On the other hand, a practical use of a "magnetic panel" has been promoted. This magnetic panel is made up by sealing a dispersion liquid (commonly presents a white color) which dispersingly suspends fine magnetic particles (which commonly presents a black color) between two plates, at least one of which is transparent, and a magnetic field is applied to the dispersion liquid from one of the two plates by the magnetic pen employing a permanent magnet. (Refer to Tokkai Sho 54-14193 Bulletin on which the patent application by the same applicant as the present invention is filed.) When a magnetic field is applied, magnetic particles are attracted to the magnetic field to present a contrast between the black color of magnetic particles and the white color of the dispersion liquid and this contrast can be identified as a figure. In other words, the dispersion liquid presents a more black color only at a position to which the magnetic field is applied by the magnetic pen. Any XY plotter apparatus capable of repeating the display can be obtained by replacing this magnetic pen with the writing tool of said XY plotter apparatus and the magnetic panel with the recording form. In this case, since the displaying magnetic field is applied to the magnetic panel by making the magnetic pen close to the magnetic panel, the magnetic pen must be moved away from the magnetic panel when moving the magnetic pen to another position for another display after a figure has been displayed. (This is so as to move the magnetic pen without applying its magnetic field.) The magnetic pen which has been moved to the specified position is made to again approach the magnetic panel and therefore a large movement of the magnetic pen in the vertical direction with reference to the magnetic panel results in a substantial reduction of the displaying speed of a figure.

OBJECT OF THE INVENTION

An object of the present invention is to provide an XY plotter apparatus having a relatively simple construction capable of displaying specified characters and figures on the magnetic panel.

Another object of the present invention is to provide an apparatus capable of erasing in a short period of time the characters and figures displayed on the magnetic panel and displaying subsequent characters and figures at a high speed.

Another further object of the present invention is to provide the apparatus capable of displaying and rewriting a mass of characters or the like on the magnetic panel.

BRIEF DESCRIPTION OF THE ACCOMPANYING DRAWINGS

DESCRIPTION OF THE PREFERRED EMBODIMENTS

The following describes the embodiments of the present invention shown in the figures.

Figure 1:
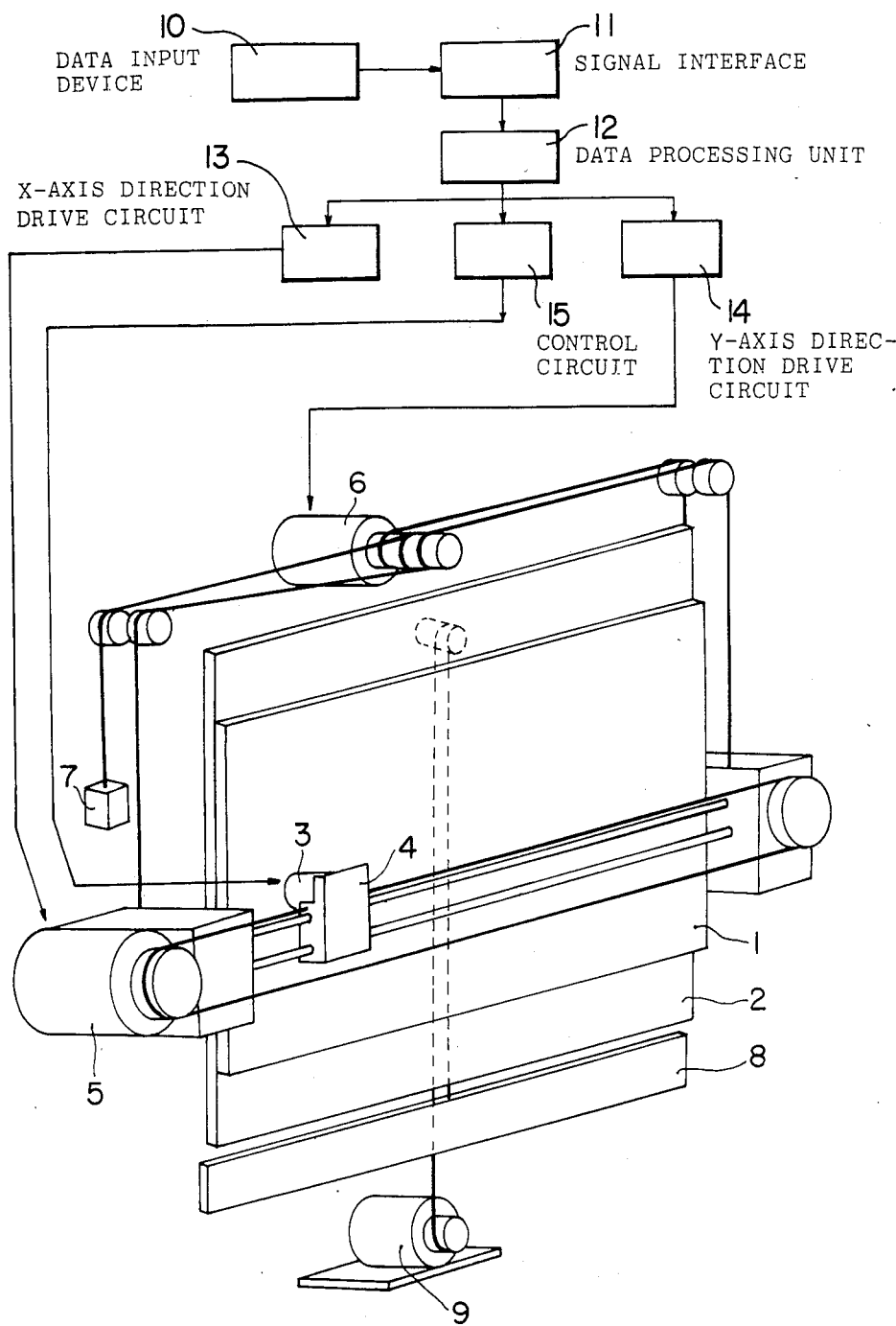
FIG. 1 is a perspective view of the display unit and a block configuration view of the driving device as an embodiment of the present invention.

FIG. 1 shows the perspective view of the display unit and the block diagram of the driving device as the first embodiment of the present invention.

In FIG. 1:

1 is a front side plate of the magnetic panel which seals the dispersion liquid containing fine magnetic particles, 2 is the rear side plate of the magnetic panel 1, 3 is the magnetic pen consisting of the electromagnet which comprises the core, coil, and current ON/OFF switch, 4 is the carriage for moving the magnetic pen 3, 5 is the X-axis direction driving device including the step motor for controlling the position of the magnetic pen 3 in the X-axis direction on the plane of the front side panel 1 of the magnetic panel, 6 is the Y-axis direction driving device including the step motor for controlling the position of the magnetic pen 3 in the Y-axis direction which orthogonally intersects the X-axis on said plane, 7 is the counterbalancing weight for reducing the load of the Y-axis direction driving device 6, 8 is the erasing magnet which is usually arranged at the opposite side to the magnetic pen 3 with the magnetic panel interposed between said erasing magnet and said magnetic pen, 9 is the erasing magnet driving device including the reversible motor for making the erasing magnet 8 contact and move away from the magnetic panel, 10 is the data input device for which, for example, a handdrawn figure input device or a word processor is employed, 11 is the signal interface, 12 is the data processing unit which comprising the central processing unit, random access memory, dedicated readout memory and input/output devices, 13 is the X-axis direction drive circuit for driving the X-axis direction driving device 5, 14 is the Y-axis direction drive circuit for driving the Y-axis direction driving device 6, and 15 is the control circuit for the current ON/OFF switch incorporated in the magnetic pen.

Plural sets of the display unit and the driving device which are wholly shown in FIG. 1 are provided and can be controlled by a single unit of data processing unit 12 since the data processing unit has a relatively large processing capacity as compared with the displaying speed of the magnetic pen, thus permitting the so-called time sharing control.

Figure 2:
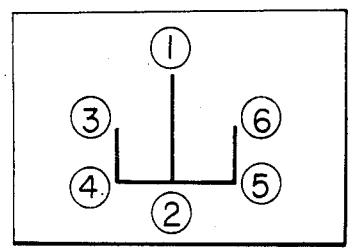
FIG. 2 is an explanatory diagram of the operation for the example of the display of the embodiment shown in FIG. 1.

The following describes the operation of the embodiment shown in FIG. 1. A hand-drawn figure input device referred to as a digitizer or a tablet as the data input device 10 or a computer is used to output the data regarding desired characters and figures to be displayed. The data is applied to the data processing unit 12 through the signal interface 11. Actually the operation of the data input device 10 is controlled by the operation of the central processing unit (CPU) in the data processing unit 12 to fetch the data. The hand-drawn figure input device referred to as the tablet is provided with a number of electrodes which are arranged parallel to at least the X axis and the Y axis and is adapted to connect said X-axis direction electrode and Y-axis direction electrode statically, magnetically or physically at the input point by the pen or the stylus. The magnetic pen 3 is positioned at the initial position by the operation of the CPU in the data processing unit 12. Therefore, the position signal is given to the X direction drive circuit 13 and the Y direction drive circuit 14 and simultaneously the switch is turned off by the control circuit 15. The magnetic pen 3 is quickly positioned at the initial position for display and, immediately after this positioning, the switch is turned on by the control circuit 15 to actuate the electromagnet of the magnetic pen 3. The specified drive signal is given to the X direction drive circuit 13 and the Y direction drive circuit 14 and the position of the magnetic pen 3 in reference to the front side plate 1 of the magnetic panel is changed and the characters and figures begin to be drawn on the front side plate of the magnetic panel. The magnetic pen 3 may move from a certain position to the other coordinate position without drawing a line. As shown in the example of display in FIG. 2, the drive in the X-axis direction is constant when the line of ①→③ is to be drawn and the value of data during the drive in the Y-axis direction varies consecutively. If the next line is ③→④ at position ②, the line between ② and ③ need not be drawn and only the magnetic pen 3 need be moved. When the X and Y-axis direction signals are given to move the magnetic pen 3, the control circuit 15 turns off the switch during the movement between position ② and position ③. The clearance between the magnetic pen 3 and the front side plate 1 of the magnetic panel can be such that the magnetic pen 3 is positioned close to the front side plate with a fixed value of distance or lightly contacts the front side plate, regardless of displaying or not displaying. The magnetic pen 3 is given the drive signal to move toward position ④ when it is at position ③ and the drive signal for movement →⑤→⑥ is given to the magnetic pen 3 after it has reached position ④.

The clearance between the magnetic pen 3 and the front side plate of the magnetic panel is not changed during the above movement of the magnetic pen 3 and therefore the magnetic pen 3 can more quickly display the characters and figures than the conventional magnetic pen using a permanent magnet.

If an erasing magnetic field of the erasing magnet 8 is applied to the rear side plate 2 of the magnetic panel by driving the erasing magnet drive device 9 when the whole display has been completed, magnet particles contained in the magnetic panel drift towards the rear side plate and the front side plate presents the color of only the dispersion liquid and the display is erased.

The hand-drawn figure input device can be of an analog type or an analog/digital combined type in addition to the digital type referred to as a digitizer or a tablet. Specified data such as the destinations of trains and the train departure schedules can be stored in advance continuously in the memory section of the floppy disk for a personal computer and outputted in sequence. The sentences which are edited on the CRT of a word processor can be outputted. The data input device is not limited to the device shown above as an example and various types of devices can be employed in dependently or in combinations.

In the above description, it is specified that the electromagnet of the magnetic pen 3 consists of the core, coil and current ON/OFF switch. The current ON/OFF switch can be installed at another place such as, for example, the control circuit 15. Needless to say, either the direct current or the alternating current can be supplied to the electromagnet which forms the magnetic pen 3.

In the second embodiment of the present invention, the position of the erasing magnet and the position of the magnetic pen are different from that shown in the first embodiment. The erasing magnet is provided in advance at the front side of the magnetic panel to perform scanning of the whole surface of the magnetic panel and the configuration of other part is left as same as in FIG. 1. In this case, closed magnetic particles are attracted onto the inside surface of the front side plate of the magnetic panel and the whole surface of the panel appears in black. When characters and figures are drawn with the magnetic pen 3 on the rear side plate of the magnetic panel, magnetic particles corresponding to drawn characters and figures are attracted onto the inside surface of the rear side plate and the pattern on the front side plate is partly erased as if negatively displayed. In this embodiment, the erasing magnet stops at the edge of the plate and the magnetic pen does not stop on the surface of the magnetic panel thus facilitating observation of the display.

The following describes the third embodiment of the present invention. The magnetic pen can be controlled so that the current to be supplied to the electromagnet of the magnetic pen is turned on and off many times within one second. In this case, the surface of the magnetic panel displays an assemblage of dots. If the requirements as to the thickness of the magnetic pen and the XY-axis direction driving device for the displaying surface of the unit are appropriately set, a high quality display which cannot be distinguished from an analog type continuous display is obtained. In this case, a feature is that a plurality of magnetic pens are provided in parallel arrangement on the same display unit and these magnetic pens are simultaneously controlled by the same control unit and drive unit to permit them perform different displays at high speed. In other words, if a plurality of magnetic pens provided on the surface of the display unit are driven in the same direction from the initial positions and the currents for respective magnetic pens are turned on and off individually, many characters and figures can be simultaneously displayed as on an information board and can be individually changed easily after lapse of a specified time.

Figure 3:
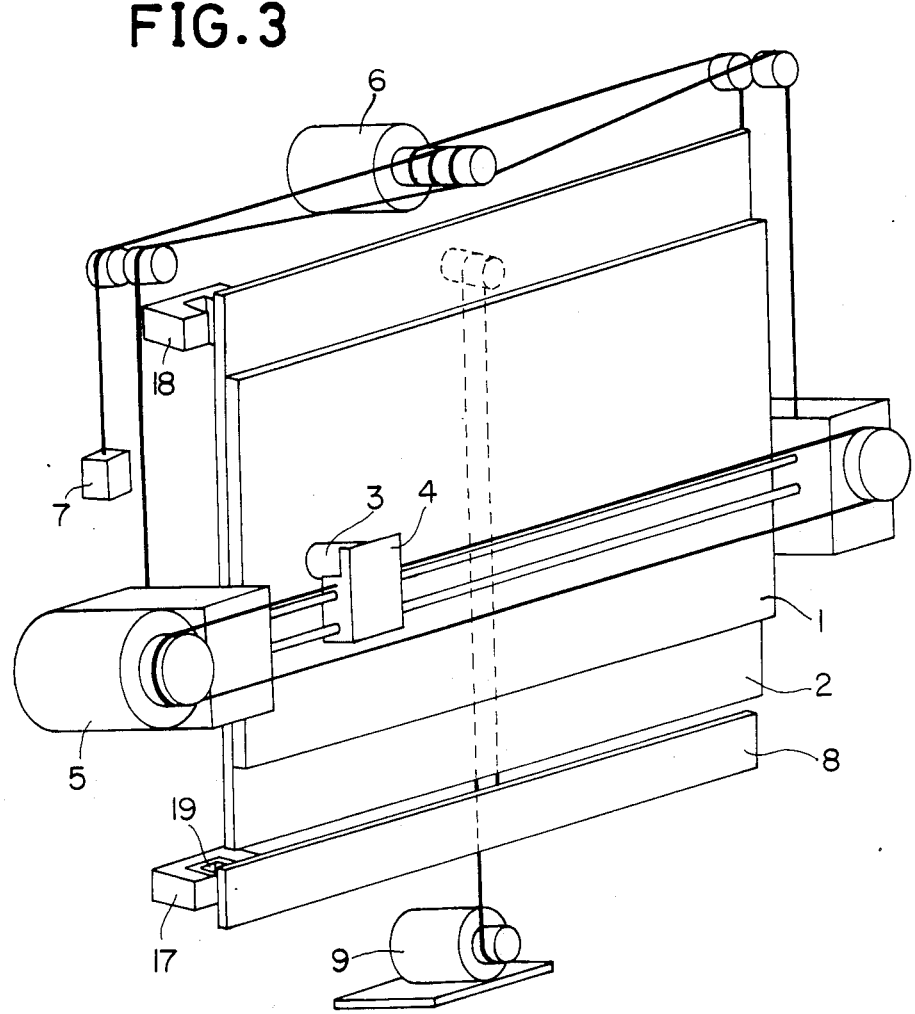
FIG. 3 is an explanatory diagram of the erasing magnet device shown in FIG. 1.

FIG. 3 shows a modification of the erasing magnet drive device shown in FIG. 1. In this embodiment, the erasing magnet drive is automatically actuated before drawing of new characters and figures.

In FIG. 3, the position detection sensors (17) and (18) consist respectively of photo interrupters and the shield plate (19) is fixed to the erasing magnet (8). Other components are given the same symbols as in FIG. 1.

Figure 4:
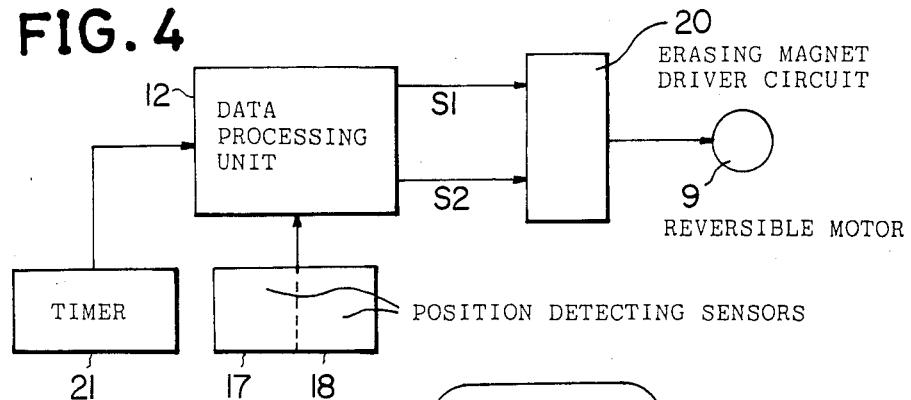
FIG. 4 is a block configuration showing the erasing magnet driving device shown in FIG. 3.

Generally, the erasing magnet (8) is stopped at a position where it interrupts the position detecting sensor (17) and the erasing magnet (8) is reciprocated between the position detecting sensors (17) and (18) by the reversible motor (9) which operates before drawing of the figures. FIG. 4 is a block diagram showing the erasing magnet drive device shown in FIG. 3. FIG. 4 shows the erasing magnet driver circuit (20) and the timer (21). The same symbols as in FIG. 1 show the similar components. The data processing unit (12) outputs the forward rotation S1 to the erasing magnet driver circuit (20) before outputting the coordinate signal and the operation signal for displaying by the XY plotter apparatus and the erasing magnet driver circuit (20) moves up the erasing magnet (8) in FIG. 3 with the drive signal given to the motor (9). The position detecting sensor (17) is released from interruption by movement of the erasing magnet (8) and comes in a conductive state. When the erasing magnet (8) reaches the the position detecting sensor (18), the position detecting sensor (17) comes in a non-conductive state. The data processing unit (12) detects this state and outputs the reverse rotation signal S2 to the erasing magnet driver circuit (20), which supplies the drive signal to the motor (9) to move down the erasing magnet (8) in FIG. 3. The position detection sonsor (18) is released from interruption by movement of the erasing magnet (8) and comes in a conductive state while the position detecting sensor (17) is interrupted to come in a non-conductive state. In this case, the data processing unit (12) which has detected the non-conductive state of the position detecting sensor (17) outputs the stop signal to the erasing magnet driver circuit (20) and the erasing magnet (8) stops at the original position in FIG. 3.

Since the magnetic panel (1) is entirely erased by the above movement, characters and figures can be drawn by the magnetic pen. If the timer (21) is set as shown in FIG. 4, the characters and figures drawn on the magnetic panel (1) can be erased after lapse of a certain fixed time.

Figure 5:
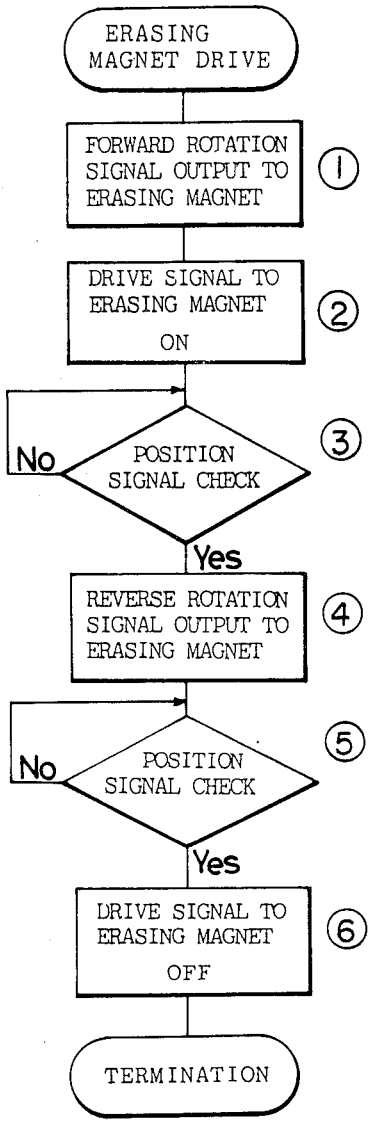
FIG. 5 is a flowchart of the erasing magnet driving program shown in FIG. 3.

The following describes the erasing magnet drive program written in the storage ROM of the data processing unit (12) according to the flowchart shown in FIG. 5. When the program is started, the CPU supplies the forward rotation signal to the erasing magnet driver circuit (20) (step ①), reads the conduction signal of the position detecting sensor (17) (step ②) and determines the non-conductive state of the position detecting sensor (18) (step ③). The CPU supplies the reverse rotation signal S2 to the erasing magnet driver circuit (20) (step ④), determines the non-conductive state of the position detecting sensor (17) (step ⑤) and supplies the stop signal to the erasing magnet driver circuit (20) if the position detecting sensor (17) is not conductive.

Figure 6:
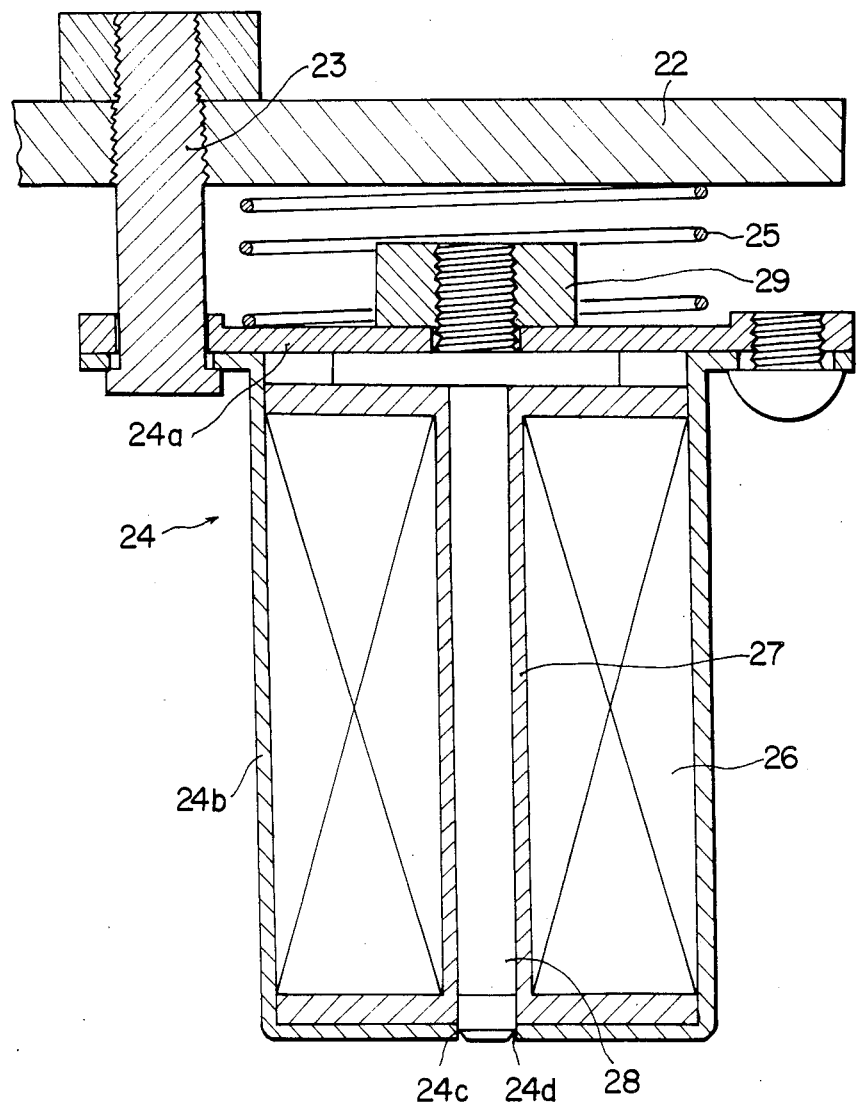
FIG. 6 is a partial cross-sectional view of the magnetic pen shown in FIG. 1.

FIG. 6 shows a partial cross sectional view of the magnetic pen shown in FIG. 1.

In FIG. 6, there are shown carriage (22), support bar (23) fixed to the carriage (22), shield case (24) made of a highly transparent material which is slidably secured on the support bar (23) and consists of the cover (24a) and the cylinder (24b) which has the bottom provided with the hole (24c), coil spring (25) which is located between the carriage (22) and the shield case (24) and contacts both the carriage and the shield case, coil (26), bobbin (27), core (28), made of a highly transparent material and screw (29) for fixing the core (27) to the shield case (24).

The carriage side part of the core (28) contacts the shield case (24) and the extreme end of the part opposite to the carriage side part, that is, the part opposed to the magnetic panel (1) is inserted into the hole (24c) to be flush with the external surface of the bottom part of the shield case and an extremely small clearance d (for example, 0.25 mm) is formed between the internal periphery of the hole and the extreme end inserted. Therefore, the closed circuit of magnetic flux formed by the core (28) and the shield case (24) and the magnetic flux leaks at the clearance (24d). A more satisfactory displaying magnetic field can be applied to the plates (1) and (2) of the magnetic panel than in case of the magnetic pen made up merely by winding coil (26) around the core (28) through the bobbin (27) and the fringes of characters and figures are made clear. If the magnetic pen is adapted to contact the plate (1) or (2) of the magnetic panel, the magnetic pen can be smoothly moved by the coil spring (25) provided.

Thus, since the magnetic pen in accordance with the present invention is made of an electromagnet, the current to be supplied to the electromagnet can be easily controlled for ON/OFF operation with the signal from the unit which is processing the data to be displayed. Accordingly, the specified characters and figures can be displayed while the magnetic pen is kept close to the magnetic panel and the drawing speed of the XY plotter apparatus is equivalent to that of the conventional XY plotter apparatus which uses the recording form. Erasing and rewriting can also be performed easily and quickly.

What is claimed is:

1. An XY plotter apparatus comprising:
   a magnetic panel having two plates of which one at least is transparent and a sealing dispersion liquid which dispersedly suspends fine magnetic particles between said two plates,
   a writing tool for applying a magnetic field to display a figure on said magnetic panel, which has an electromagnet having at least a core and a coil,
   a writing tool driving device which drives said writing tool to a prescribed position by contacting said writing tool with said magnetic panel,
   a control means which controls the driving of said writing tool driving device and the current for said writing tool, and
   an erasing magnetic field generating device, wherein said writing tool is kept in contact with said magnetic panel by a spring, and wherein said control means includes a data processing unit, an X direction drive circuit, a Y direction drive circuit, a current ON/OFF switch for said coil of said electromagnet and a control circuit for said current ON/OFF switch, and wherein the data comprising the X-axis and Y-axis coordinate signals corresponding to a figure to be displayed and control data for said current ON/OFF switch are inputted to said data processing unit so that, the X-axis and Y-axis coordinate signals are fed to said writing tool driving device and the control data is inputted to said control circuit, and wherein a signal for switching said current ON/OFF switch from an ON state to an OFF state is generated by said control circuit while said writing tool moves from the position where the specified display is completed to a position for starting next display.

2. An XY plotter apparatus in accordance with claim 1, wherein data to be displayed which is inputted into said writing tool is obtained from a hand-drawn figure input device.

3. An XY plotter apparatus in accordance with claim 1, wherein data to be displayed which is inputted into said writing tool drive device for controlling the position of the writing tool is obtained from a personal computer.

4. An XY plotter apparatus in accordance with claim 1, wherein an alternating current is applied to the electromagnet of said writing tool.

5. An XY plotter apparatus in accordance with claim 1, wherein a plurality of writing tools are provided and different data to be displayed are applied to said writing tools, respectively for simultaneously displaying both letters and figures.

6. An XY plotter apparatus in accordance with claim 1, wherein said erasing magnetic field generating device is actuated by a data signal for displaying operation when said data signal is inputted and subsequently the data signal is applied to the writing tools.

7. An XY plotter apparatus in accordance with claim 2, wherein an alternating current is applied to the electromagnet of said writing tool.

8. An XY plotter apparatus in accordance with claim 3, wherein an alternating current is applied to the electromagnet of said writing tool.

9. An XY plotter apparatus in accordance with claim 2, wherein a plurality of writing tools are provided and different data to be displayed are respectively applied to said writing tools for simultaneously displaying both figures and letters.

10. An XY plotter apparatus in accordance with claim 3, wherein a plurality of writing tools are provided and different data to be displayed are respectively applied to said writing tools for simultaneously displaying both figures and letters.

11. An XY plotter apparatus in accordance with claim 4, wherein a plurality of writing tools are provided and different data to be displayed are respectively applied to said writing tools for simultaneously displaying both figures and letters.

12. An XY plotter apparatus in accordance with claim 2, wherein said erasing magnetic field generating device is actuated by a data signal for displaying operation when said data signal is inputted and subsequently the data signal is applied to the writing tools.

13. An XY plotter apparatus in accordance with claim 3, wherein said erasing magnetic field generating device is actuated by a data signal for displaying operation when said data signal is inputted and subsequently the data signal is applied to the writing tools.

14. An XY plotter apparatus in accordance with claim 4, wherein said erasing magnetic field generating device is actuated by a data signal for displaying operation when said data signal is inputted and subsequently the data signal is applied to the writing tools.

15. An XY plotter apparatus in accordance with claim 5, wherein said erasing magnetic field generating device is actuated by a data signal for displaying operation when said data signal is inputted and subsequently the data signal is applied to the writing tools.

* * * * *